May 20, 1924.
C. J. LOYED
1,495,025
AUTOMOBILE STEERING WHEEL
Filed Sept. 6, 1923
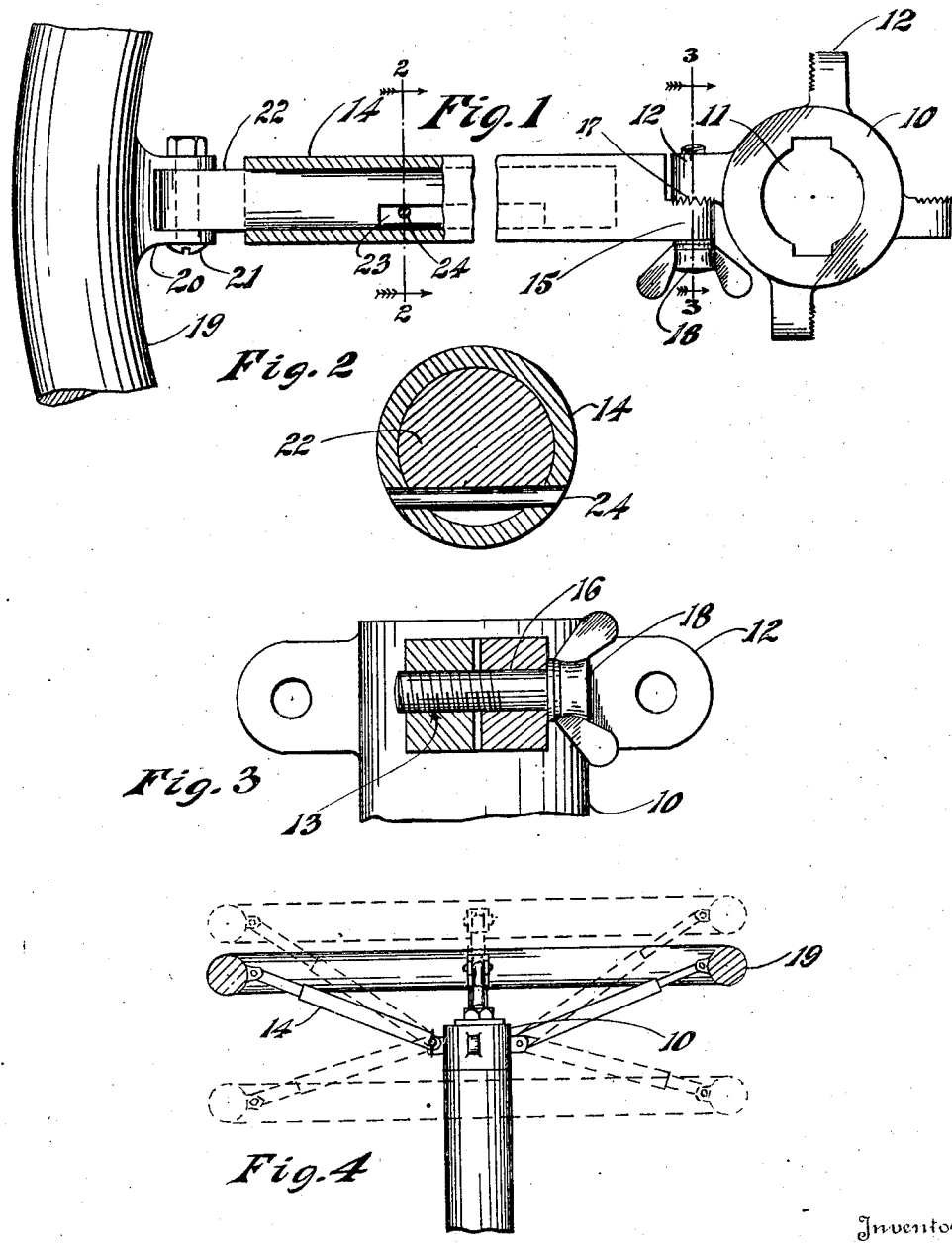
Inventor
Charles J. Loyed
By
Attorney Patented May 20, 1924.

1,495,025

UNITED STATES PATENT OFFICE.

CHARLES J. LOYED, OF WAYCROSS, GEORGIA.

AUTOMOBILE STEERING WHEEL.

Application filed September 6, 1923. Serial No. 661,224.

*To all whom it may concern:*

Be it known that I, CHARLES J. LOYED, a citizen of the United States, residing at Waycross, in the county of Ware and State of Georgia, have invented certain new and useful Improvements in Automobile Steering Wheels, of which the following is a specification.

This invention relates to a steering wheel for automobiles, and has special reference to a steering wheel adjustable for different persons so that they may conveniently reach the wheel whether their arms be short or long.

One important object of the invention is to improve and simplify the general construction of devices of this character.

A second important object of the invention is to provide an improved steering wheel wherein a person at the wheel may quickly adjust the same to suit his reach.

A third important object of the invention is to provide an improved wheel of this description wherein such adjustment may be effected in a simple manner, and without interfering with the rotative tendency exerted by the wheel, no matter in what position it may be in.

With the above and other objects in view as will be hereinafter apparent, the invention consists in general of certain novel details of construction and combinations of parts hereinafter more fully described, illustrated in the accompanying drawings and specifically claimed.

In the accompanying drawings like characters of reference indicate like parts in the several views, and:

Fig. 1 is a face view of a portion of the wheel showing the hub and one of the spokes.

Fig. 2 is a section on the line 2—2 of Fig. 1 on an enlarged scale.

Fig. 3 is an enlarged section on the line 3—3 of Fig. 1.

Fig. 4 is a detail side elevation of a steering post with the improved wheel thereon, the wheel being shown in one position in full lines, and in two other positions in dotted lines in order to show the different adjustments of which the wheel is capable.

In the embodiment of the invention herein illustrated, there is provided a wheel which consists of a hub 10, having an opening 11 therein of suitable shape and size to fit on top of the steering shaft of an automobile. Extending outwardly from the hub 10 is a series of lugs 12, each having a screw threaded opening 13 therein. Each of the spokes of the wheel consist of an inner tubular member 14 open at one end, and provided at its other end with a lug 15 complementary to the lugs 12, and provided with a smooth bolt receiving opening 16. The lugs 12 and 15 have their confronting faces provided with serrations 17 disposed radially with respect to the centers of the openings 13 and 16, so that when the lugs are brought together, the serrations form a mechanical lock against pivotal movement of the members 14 on these lugs.

In order to hold the lugs 12 and 15 together, there is provided for each pair of lugs a butterfly headed bolt 18, which passes through the opening 16, and is screwed into the opening 13. As can be readily understood, tightening of these bolts locks the members 14 in adjustable angular relation to the hub. The wheel is provided with the usual rim 19 from which extends inwardly projecting lugs 20, wherethrough passes pivot pins 21 on which are pivoted outer spoke members 22 slidable telescopically in the inner members 14. Each of these outer spoke members is provided along one side with a slot or recess 23, and a pin 24 passes through the respective inner member 14, and thus limits the telescopic movement, since the ends of the slots engage against said pin in the extreme outward movement and the extreme inward movement.

Now referring to Fig. 4, it will be supposed that the normal position for the person of average reach is shown in full line. If a person of short reach wishes to use the wheel, the butterfly nuts 18 are loosened and the wheel grasped and pulled toward the person until it is in such a position, as shown in the upper dotted lines, or such other position as may be suitable to the user. The butterfly nuts are then screwed in, and the wheel will be locked firmly in its adjusted position at a convenient place for easy reach of the driver of the machine.

In like manner, it will be obvious that adjustment for a person of long reach will be made in the direction of the lower dotted line showing in Fig. 4.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is wished to include all such as properly come within the scope claimed.

Having thus described the invention, what is claimed as new, is:

In a steering wheel, a hub, a series of lugs projecting outwardly from the hub and each having a bolt receiving opening, a series of tubular members each having one end open and the other end provided with a lug cooperating with one of the hub lugs and provided with a bolt receiving opening registering with the opening in a respective hub lug, the confronting faces of the cooperating lugs being provided with serrations extending radially from the bolt openings, clamp bolts each engaging a pair of cooperating lugs, a wheel rim, rods each having one end pivoted to the wheel rim and its other end engaged in a respective tubular member to form a telescopic spoke, and means to limit the extent of telescopic movement of the rods and tubular members.

In testimony whereof I affix my signature.

CHARLES J. LOYED.